US012518782B1

(12) United States Patent
Matsumoto (10) Patent No.: US 12,518,782 B1
(45) Date of Patent: Jan. 6, 2026

(54) HEAT ASSISTED MAGNETIC RECORDING HEAD COMPRISING A THERMALLY STABLE MATERIAL

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/896,353

(22) Filed: Sep. 25, 2024

(51) Int. Cl.
*G11B 5/31* (2006.01)
*G11B 5/60* (2006.01)
*G11B 13/08* (2006.01)
*G11B 5/00* (2006.01)

(52) U.S. Cl.
CPC ............ *G11B 5/314* (2013.01); *G11B 5/3116* (2013.01); *G11B 5/6088* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,107,326 B1 | 1/2012 | Hirano et al. | |
| 8,184,507 B1 | 5/2012 | Hirano et al. | |
| 9,065,236 B2 | 6/2015 | Goulakov et al. | |
| 9,286,920 B1 | 3/2016 | Hu et al. | |
| 10,403,315 B2 | 9/2019 | Matsumoto et al. | |
| 10,522,176 B1 * | 12/2019 | Yan | G11B 5/314 |
| 10,636,442 B2 * | 4/2020 | Matsumoto | G11B 5/6088 |
| 11,626,137 B1 * | 4/2023 | Fan | G11B 5/02 369/13.33 |
| 11,798,582 B2 | 10/2023 | Puri et al. | |
| 12,119,032 B1 * | 10/2024 | Matsumoto | G11B 13/08 |
| 2005/0167830 A1 | 8/2005 | Chang et al. | |
| 2005/0183960 A1 | 8/2005 | Andideh et al. | |
| 2006/0220192 A1 | 10/2006 | Kurachi et al. | |
| 2006/0251137 A1 | 11/2006 | Sung et al. | |
| 2007/0201530 A1 | 8/2007 | Rhee et al. | |
| 2008/0054457 A1 | 3/2008 | Lin et al. | |
| 2009/0154514 A1 | 6/2009 | Oh et al. | |

(Continued)

OTHER PUBLICATIONS

U.S. Appl. No. 18/229,779, filed Aug. 3, 2023.

(Continued)

*Primary Examiner* — Peter Vincent Agustin
(74) *Attorney, Agent, or Firm* — Patterson + Sheridan, LLP (57) ABSTRACT

The present disclosure generally relates to a magnetic recording head for a magnetic media drive. The magnetic recording head comprises a main pole, a waveguide disposed adjacent to the main pole, a near field transducer (NFT) coupled between the main pole and the waveguide, the NFT being recessed from a media facing surface (MFS), a thermal shunt disposed on the NFT, the thermal shunt being recessed from the MFS, and a stable material disposed between the NFT and the MFS. The stable material is spaced from the thermal shunt, and the stable material and the NFT comprise different materials. In some embodiments, a surface of the stable material facing the waveguide is tapered. The stable material may comprise two or more layers, the two or more layers comprising different materials.

20 Claims, 8 Drawing Sheets

(56) References Cited

U.S. PATENT DOCUMENTS

| | | |
|---|---|---|
| 2009/0225636 A1 | 9/2009 | Hirano et al. |
| 2010/0085664 A1 | 4/2010 | Hirata et al. |
| 2011/0216635 A1 | 9/2011 | Matsumoto |
| 2012/0230361 A1 | 9/2012 | Adachi et al. |
| 2015/0036470 A1* | 2/2015 | Balamane ............ G11B 5/3136 369/13.33 |
| 2016/0284370 A1 | 9/2016 | Takayama et al. |
| 2016/0329068 A1* | 11/2016 | Matsumoto .......... G11B 5/3106 |
| 2017/0256277 A1 | 9/2017 | Peng |
| 2018/0158473 A1* | 6/2018 | Gorantla .................. G11B 5/40 |
| 2019/0251992 A1* | 8/2019 | Ho ......................... G11B 5/235 |
| 2020/0091679 A1 | 3/2020 | Furuyama |
| 2020/0144792 A1 | 5/2020 | Dummer |
| 2021/0398556 A1 | 12/2021 | Stipe et al. |
| 2023/0059099 A1* | 2/2023 | Yu ........................... G11B 13/08 |
| 2023/0245681 A1* | 8/2023 | Matsumoto ............ G11B 13/08 369/13.33 |
| 2024/0135964 A1* | 4/2024 | Wee ....................... G11B 5/314 |

OTHER PUBLICATIONS

International Search Report and Written Opinion for International Application No. PCT/US2022/016654 dated Jun. 27, 2022.
International Search Report and Written Opinion for International Application No. PCT/US2022/019987 dated Aug. 9, 2022.

* cited by examiner

HEAT ASSISTED MAGNETIC RECORDING HEAD COMPRISING A THERMALLY STABLE MATERIAL

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 $Tbit/in^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature may reach more than 150 degrees Celsius over the operational temperature of the magnetic disk device, causing the NFT to deform.

Therefore, there is a need in the art for an improved HAMR magnetic media drive.

SUMMARY OF THE DISCLOSURE

The present disclosure generally relates to a magnetic recording head for a magnetic media drive. The magnetic recording head comprises a main pole, a waveguide disposed adjacent to the main pole, a near field transducer (NFT) coupled between the main pole and the waveguide, the NFT being recessed from a media facing surface (MFS), a thermal shunt disposed on the NFT, the thermal shunt being recessed from the MFS, and a stable material disposed between the NFT and the MFS. The stable material is spaced from the thermal shunt, and the stable material and the NFT comprise different materials. In some embodiments, a surface of the stable material facing the waveguide is tapered. The stable material may comprise two or more layers, the two or more layers comprising different materials.

In one embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein: the stable material and the NFT comprise different materials, and the stable material comprises a first surface disposed at the MFS, a second surface opposite the first surface, a third surface facing the waveguide, and a fourth surface facing the main pole.

In another embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein the stable material comprises: a first surface disposed at the MFS, a second surface opposite the first surface, the second surface being disposed in contact with the NFT, a third surface facing the waveguide, a fourth surface facing the main pole, a fifth surface connecting the third surface to the fourth surface, and a sixth surface opposite the fifth surface, wherein the stable material and the NFT comprise different materials.

In yet another embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein the stable material comprises: a first surface disposed at the MFS, a second surface opposite the first surface, the second surface being disposed in contact with the NFT, a third surface facing the waveguide, and a fourth surface facing the main pole, wherein the stable material comprises a first layer and a second layer, the first layer, the second layer, and the NFT each comprising different materials.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head for a magnetic media drive. The magnetic recording head comprises a main pole, a waveguide disposed adjacent to the main pole, a near field transducer (NFT) coupled between the main pole and the waveguide, the NFT being recessed from a media facing surface (MFS), a thermal shunt disposed on the NFT, the thermal shunt being recessed from the MFS, and a stable material disposed between the NFT and the MFS. The stable material is spaced from the thermal shunt, and the stable material and the NFT comprise different materials. In some embodiments, a surface of the stable material facing the waveguide is tapered. The stable material may comprise two or more layers, the two or more layers comprising different materials.

Figure 1:
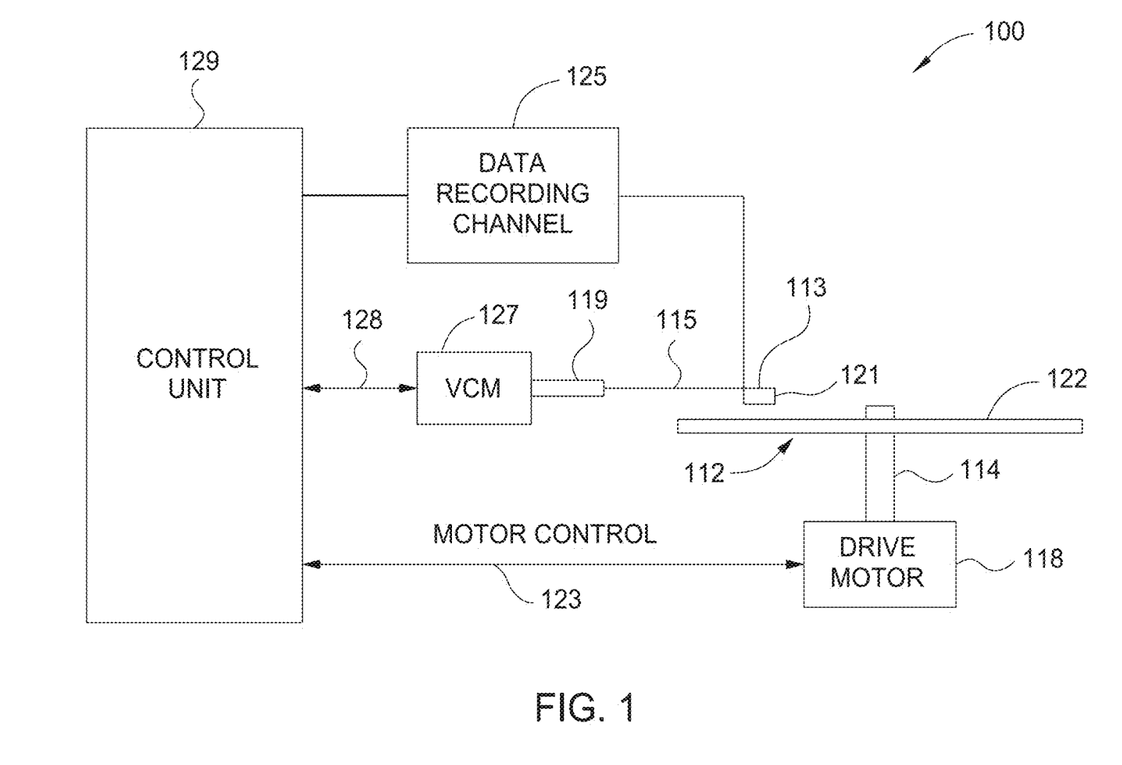
FIG. 1 is a schematic illustration of certain embodiments of a magnetic media drive including a HAMR magnetic write head.

FIG. 1 is a schematic illustration of certain embodiments of a magnetic media drive 100 including an energy-assisted magnetic recording (EAMR) write head, such as a heat-assisted magnetic recording (HAMR) or microwave assisted magnetic recording (MAMR) write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
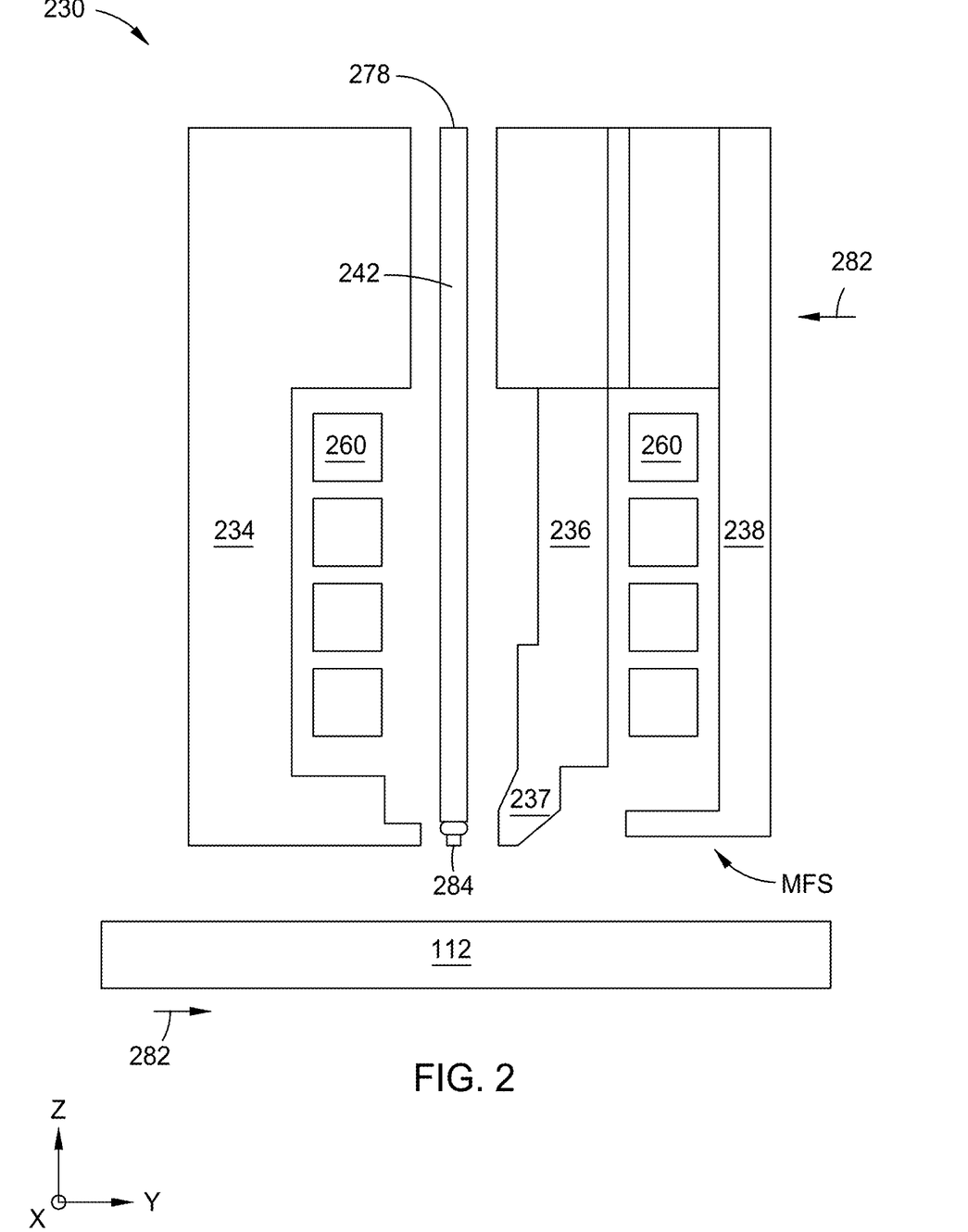
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The waveguide 242, may be a spot size converter (SSC) that includes numerous waveguides and a multimodal interference (MMI) device. The present disclosure generally relates to the management and enhancement of the profile of the SSC. The SSC discussed herein results in significant improvement in the overall coupling efficiency between a coherent light source and the waveguide inside a photonic integrated circuit (PIC) or planar waveguide circuit (PLC) of a HAMR head slider. The geometry and position of the core materials/assist core channels both on the lateral and vertical vicinity of a center waveguide core are discussed herein. The overall field profile of the SSC can be tuned to match the field profile or the mode of a coherent light source, leading to significant enhancement in the overall coupling efficiency.

Optical power from an external coherent light source (i.e., EELD, surface emitting diode laser, VCSEL device, or fiber coupled diode laser) is coupled into the PLC of the HAMR head slider through the SSC or mode converter. The basic design concept is to match the mode profile of the incoming light source and the mode profile of the PLC, both at the coupling interface, hence maximizing the overall coupling efficiency.

Figure 3A:
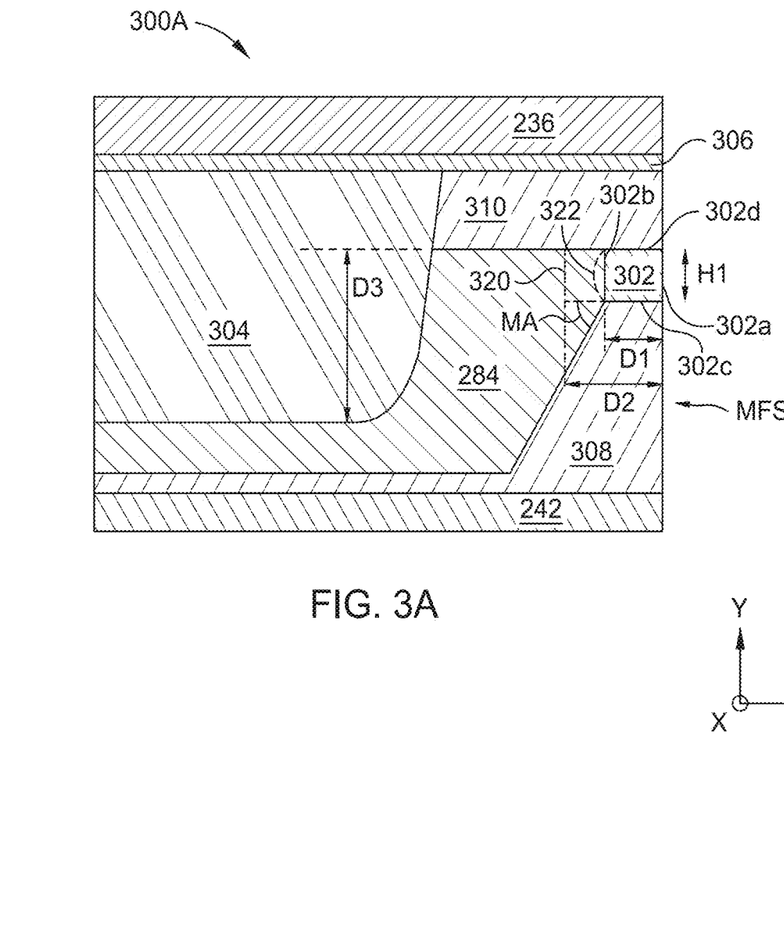
FIGS. 3A-3I illustrate various views of a portion of HAMR write heads, according to embodiments herein.
Figure 3B:
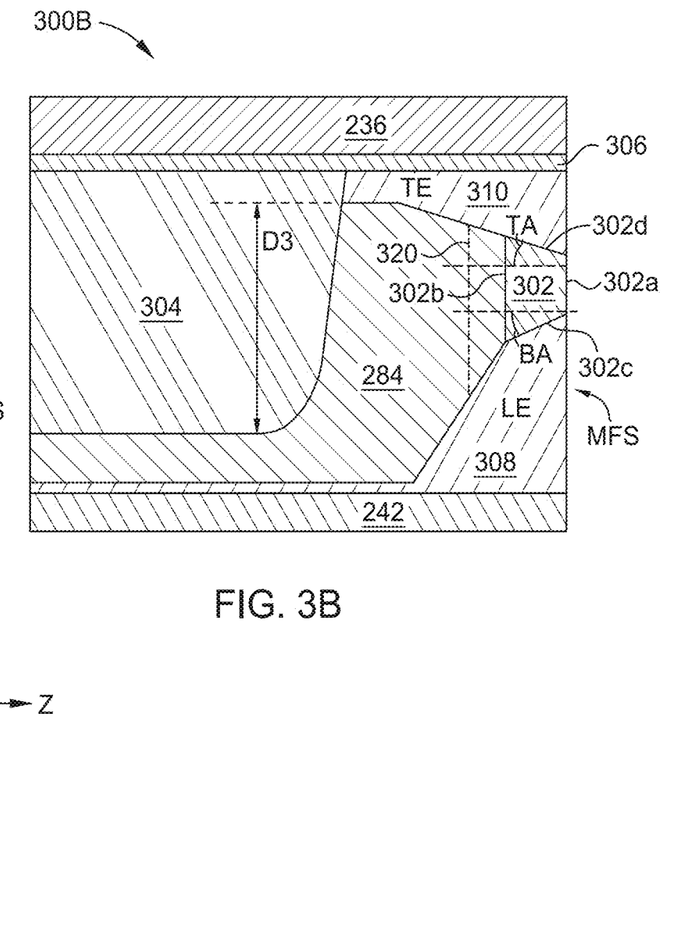
Figure 3C:
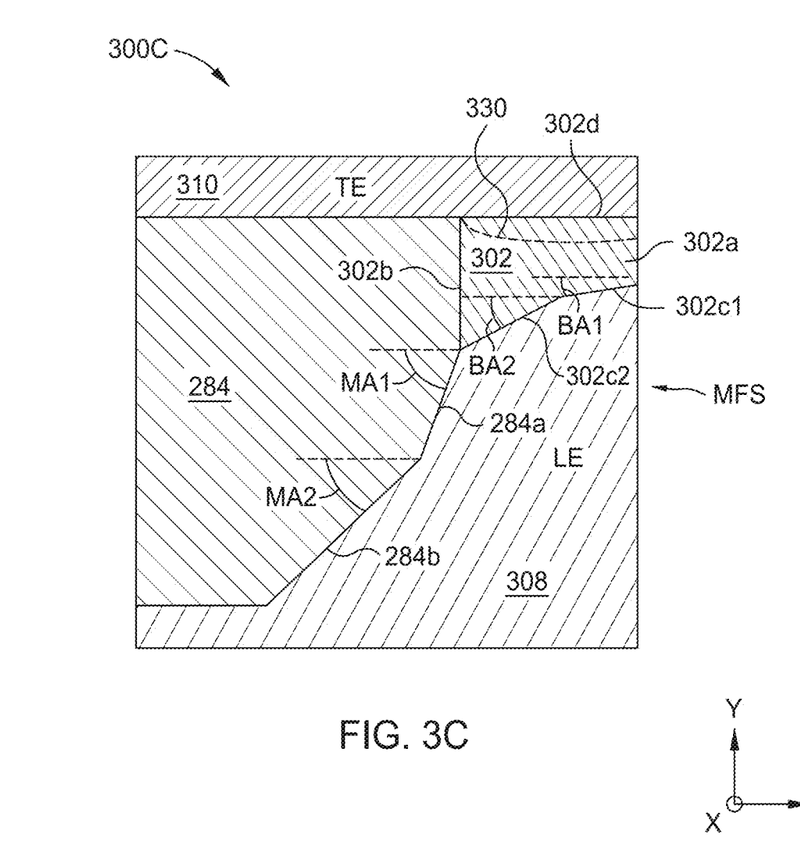
Figure 3D:
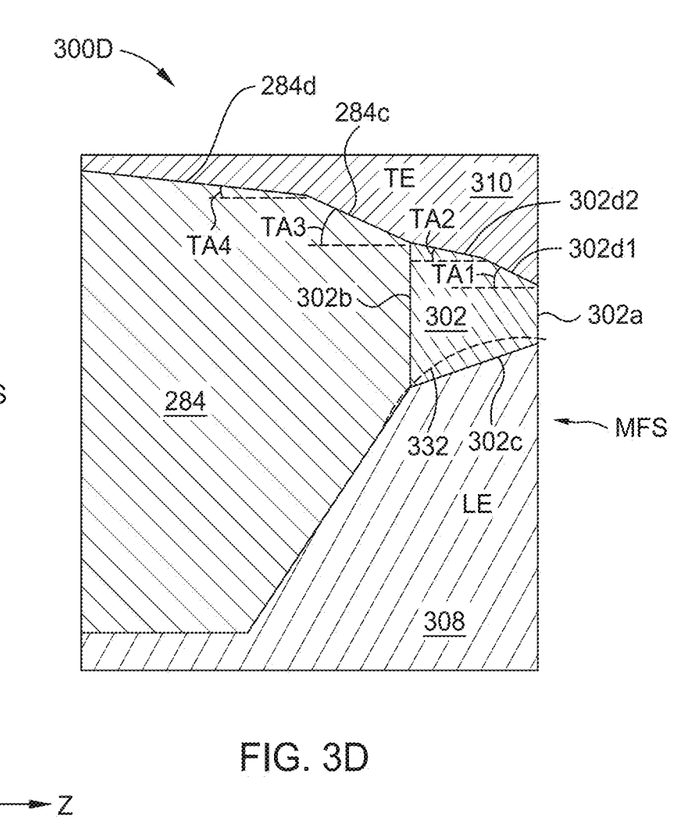
Figure 3E:
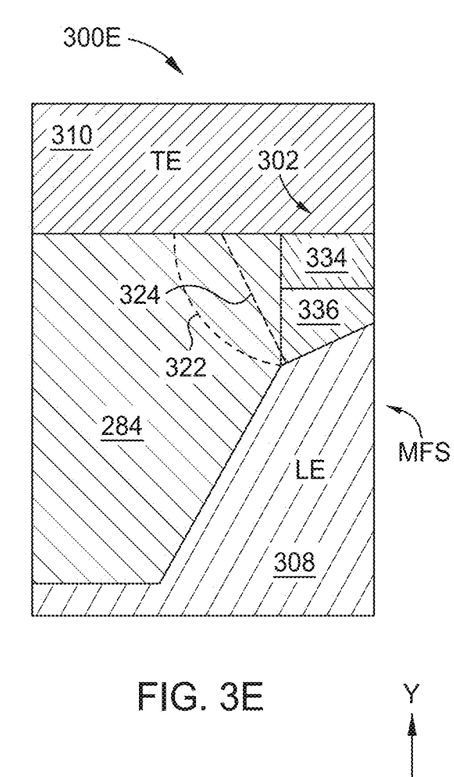
Figure 3F:
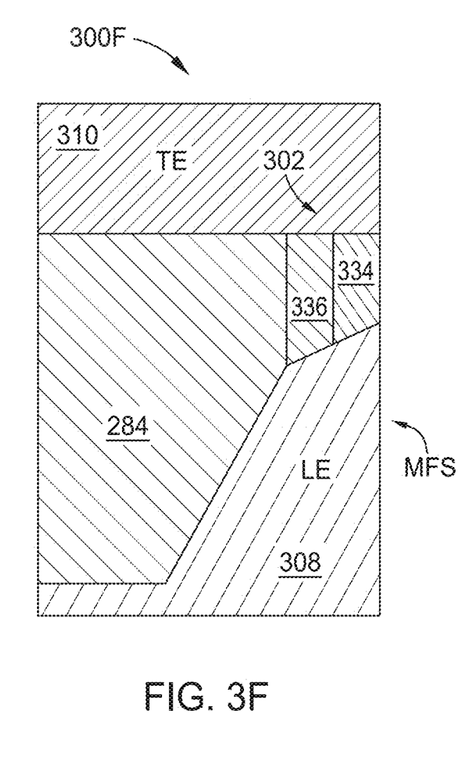
Figure 3G:
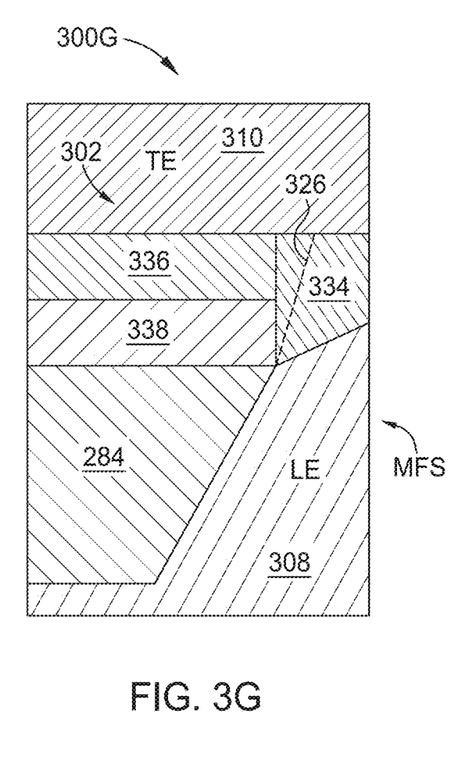
Figure 3H:
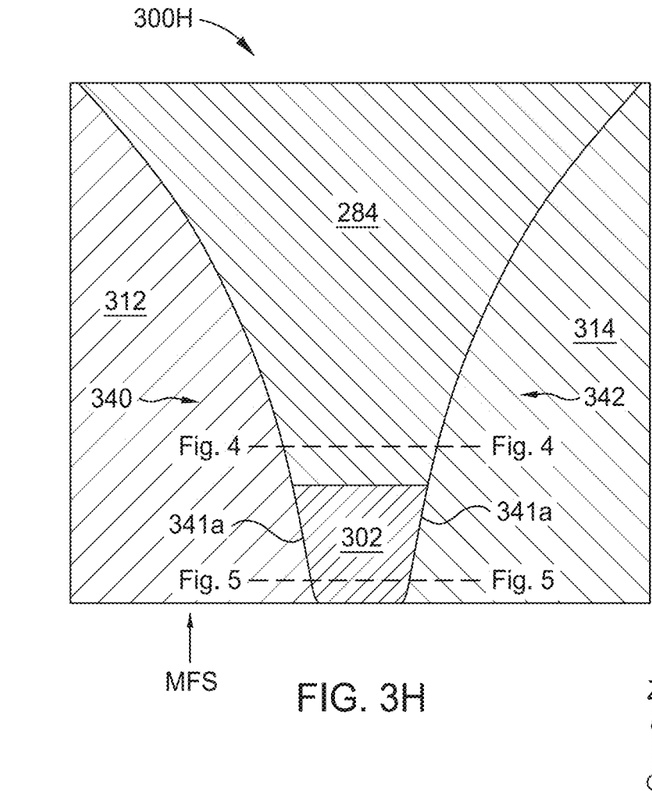
Figure 3I:
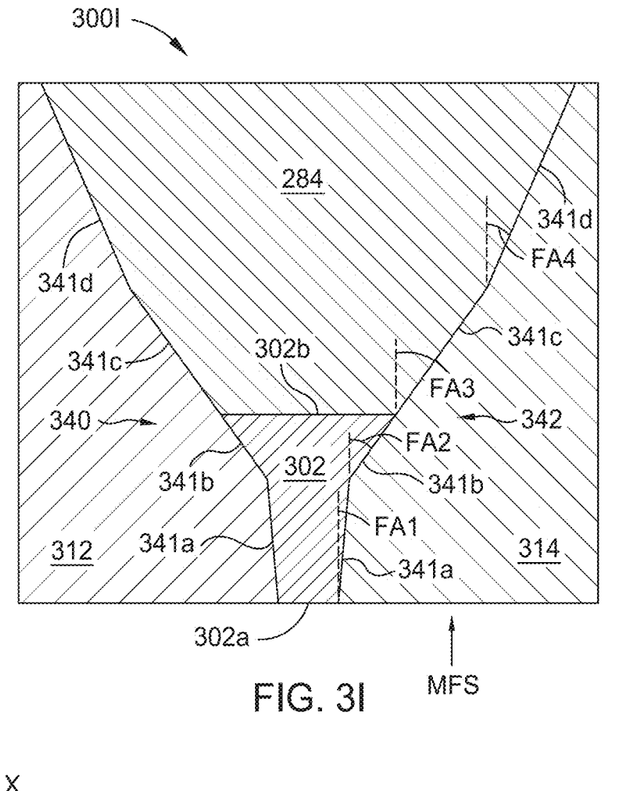

FIGS. 3A-3I illustrate various views of a portion of HAMR write heads 300A, 300B, 300C, 300D, 300E, 300F, 300G, 300H, 300I, respectively, according to embodiments herein. FIGS. 3A-3G illustrate cross-sectional views, and FIGS. 3I and 3J illustrate top views. Each of the HAMR write heads 300A, 300B, 300C, 300D, 300E, 300F, 300G, 300H, 300I may individually be the HAMR write head 230 of FIG. 2, and each of the HAMR write heads 300A, 300B, 300C, 300D, 300E, 300F, 300G, 300H, 300I may individually be, or be a part of, the magnetic media drive 100 of FIG.

1. Aspects of the HAMR write heads 300A, 300B, 300C, 300D, 300E, 300F, 300G, 300H, 300I may be used in combination with one another.

While only shown in FIGS. 3A and 3B for clarity, each HAMR write head 300A-300I comprises the main pole 236, the waveguide 242, and the NFT 284 disposed therebetween. In each HAMR write head 300A-300J, a thermal shunt 304 is disposed on the NFT 284 recessed from the MFS. The depth D3 of the thermal shunt 304 measured from the top of the NFT 284 is about 5% to about 90% of the thickness of NFT 284. The depth D3 may be 0 nm such that the bottom of thermal shunt 304 is aligned to the top surface of the NFT 284, or the depth D3 may be equal to the thickness of NFT 284 such that the bottom of thermal shunt 304 is aligned to the bottom surface of the NFT 284. A diffusion barrier 306 is disposed between and in contact with the main pole 236 and the thermal shunt 304. The diffusion barrier 306 extends to the MFS. A first insulating layer 308 is disposed between the NFT 284 and the waveguide 242. A second insulating layer 310 is disposed adjacent to the diffusion barrier 306 and to the thermal shunt 304. A stable material 302 is disposed between the NFT 284, the second insulating layer 310, and the thermal shunt 304 at the MFS. The stable material 302 is spaced from the thermal shunt 304, and comprises a different material than the NFT 284.

The stable material 302 comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The NFT 284 may comprise a material with low optical loss, such as Au, Ag, Cu, Al, Rh, Ir, Ru, Cr, Pt, Ti, Fe, Co, Ni, Pd, Cd, Zn, combinations thereof, or alloys thereof. The thermal shunt 304 may comprise a material with high thermal conductivity, such as Au, Ag, Cu, Al, Rh, Ir, Ru, Cr, Pt, Ti, Fe, Co, Ni, Pd, Cd, Zn, combinations thereof, or alloys thereof. The diffusion barrier 306 may comprise Ru, Rh, Ti, W, Mo, or Pt. The first and second insulating layers 308, 310 may each individually comprise a transparent dielectric material, such as $SiO_2$, $Al_2O_3$, Silicon Oxynitride ($SiO_xN_y$; where x and y are numerals greater than 1), Aluminum Silicon Oxide ($Al_2O_3$—$SiO_2$), $MgF_2$, MgO, $TiO_2$, $Ta_2O_5$, $Y_2O_3$, SIN, SiC, AlN, or Ge doped $SiO_2$, for example.

In the HAMR write head 300A of FIG. 3A, the stable material 302 has a substantially square or rectangular shape such that one or more of a first surface 302a disposed at the MFS, a second surface 302b opposite the first surface 302a, a third surface 302c disposed at a leading edge (LE) side (i.e., facing the waveguide 242), and a fourth surface 302d disposed at a trailing edge (TE) side (i.e., facing the main pole 236) each have the same dimensions. The third surface 320c may be referred to as a LE surface 302c, and the fourth surface 302d may be referred to as a TE surface 302d. The stable material 302 has a height H1 in the y-direction of about 5 nm to about 30 nm, such as about 20 nm. The stable material 302 recesses the NFT 284 from the MFS (i.e., in the −z-direction) a distance D1 of about 3 nm to about 30 nm, such as about 10 nm. The surface of the NFT 284 disposed adjacent to the MFS is disposed at an angle MA of about 30 degrees to about 90 degrees, such as about 65 degrees.

In one embodiment, the second surface 302b may be angled about 40 degrees to about 80 degrees towards the thermal shunt 304 such that the fourth surface 302d has a greater length in the z-direction than the third surface 302c, like shown by the dotted line 324 in FIG. 3E. In another embodiment, the second surface 302b may be angled about 100 degrees to about 110 degrees towards the MFS such that the third surface 302c has a greater length in the z-direction than the fourth surface 302d, like shown by the dotted line 326 in FIG. 3G. In yet another embodiment, the second surface 302b may be rounded (as shown by the dotted line 322 in FIGS. 3A and 3E) with a radius of curvature of about 10 nm to about 40 nm. The stable material 302 may extend further into the NFT 284 (as shown by the dotted like 320) a distance D2 of about 10 nm to about 40 nm, such as about 20 nm. In such an embodiment, the stable material 302 would no longer have a rectangular shape.

In the HAMR write head 300B of FIG. 3B, the stable material 302 has a substantially trapezoidal shape, as the both the trailing edge (TE) side and the leading edge (LE) side are tapered. The TE side and LE side of the NFT 284 are also at least partially tapered. The third surface 302c and the fourth surface 302d are both angled such that the second surface 302b has a greater length in the y-direction than the first surface 302a. For example, the first surface 302a may have a height in the y-direction of about 5 nm to about 30 nm, and the second surface 302b may have a height in the y-direction of about 15 nm to about 50 nm. The third surface 302c is angled (BA) about 5 degrees to about 50 degrees, such as about 30 degrees, with respect to a plane perpendicular to the MFS. The fourth surface 302d is angled (TA) about 5 degrees to about 50 degrees, such as about 30 degrees, with respect to a plane perpendicular to the MFS. Similar to the HAMR write head 300A of FIG. 3A, the stable material 302 may extend further into the NFT 284, like shown by the dotted like 320. One of third surface 302c or the fourth surface 302d may be substantially perpendicular to the MFS, like shown in the HAMR write head 300A of FIG. 3A.

In the HAMR write head 300C of FIG. 3C, the LE side of the stable material 302 is tapered such that the stable material 302 has a LE taper (LET). The fourth surface 302d may be tapered or untapered. The LE side of the stable material 302 comprises a first LE surface 302c1 adjacent to the MFS and a second LE surface 302c2 disposed adjacent to the NFT 284. The first LE surface 302c1 is disposed at an angle BA1 of about 5 degrees to about 30 degrees with respect to a plane perpendicular to the MFS. The second LE surface 302c2 is disposed at an angle BA2 of about 5 degrees to about 40 degrees with respect to a plane perpendicular to the MFS. For example: the first angle BA1 may be about 5 degrees to about 10 degrees and the second angle BA2 may be about 30 degrees to about 40 degrees; the first angle BA1 may be about 20 degrees to about 30 degrees and the second angle BA2 may be about 5 degrees to about 10 degrees; or the first angle BA1 and the second angle BA2 may each be between about 20 degrees to about 30 degrees. In yet another embodiment, the LE side of the stable material 302 may be curved, like shown by the dotted line 332 in FIG. 3D.

The LE side of the NFT 284 comprises a first angled or tapered surface 284a disposed adjacent to the second LE surface 302c2 of the stable material 302 and a second angled or tapered surface 284b disposed adjacent to the first surface 284a. The first surface 284a is disposed at an angle MA1 of about 20 degrees to about 90 degrees, and the second surface 284b is disposed at an angle MA2 of about 45 degrees to about 90 degrees. For example: the first angle MA1 may be about 80 degrees to about 85 degrees and the second angle MA2 may be about 50 degrees to about 60 degrees; the first angle MA1 may be about 80 degrees to about 85 degrees and the second angle MA2 may be about 50 degrees to about 60 degrees; or the first angle MA1 and the second angle MA2 may each be about 60 degrees to about 70 degrees, such as about 65 degrees. While two LE surfaces and angles are shown for both the stable material 302 and the NFT 284, the stable material 302 and the NFT 284 may each comprise additional or fewer LE surfaces and angles.

In the HAMR write head 300D of FIG. 3D, the TE side of the stable material 302 is tapered such that the stable material 302 has a TE taper (TET). The third surface 302c may be tapered or untapered. The TE side of the stable material 302 comprises a first TE surface 302d1 adjacent to the MFS and a second TE surface 302d2 disposed adjacent to the NFT 284. The first TE surface 302d1 is disposed at an angle TA1 of about 5 degrees to about 40 degrees with respect to a plane perpendicular to the MFS. The second TE surface 302d2 is disposed at an angle TA2 of about 5 degrees to about 30 degrees with respect to a plane perpendicular to the MFS. For example: the first angle TA1 may be about 30 degrees to about 40 degrees and the second angle TA2 may be about 5 degrees to about 10 degrees; or the first angle TA1 may be about 5 degrees to about 10 degrees and the second angle TA2 may be about 20 degrees to about 30 degrees. In yet another embodiment, the TE side of the stable material 302 may be curved, like shown by the dotted line 330 in FIG. 3C.

The TE side of the NFT 284 comprises a first angled or tapered surface 284c disposed adjacent to the second TE surface 302d2 of the stable material 302 and a second angled or tapered surface 284d disposed adjacent to the third surface 284c. The first surface 284c is disposed at an angle TA3 of about 40 degrees to about 60 degrees, and the second surface 284d is disposed at an angle TA4 of about 10 degrees to about 30 degrees. For example: the first angle TA3 may be about 40 degrees to about 50 degrees and the second angle TA4 may be about 10 degrees to about 20 degrees; or the first angle TA3 may be about 50 degrees to about 60 degrees and the second angle TA4 may be about 20 degrees to about 30 degrees. While two TE surfaces and angles are shown for both the stable material 302 and the NFT 284, the stable material 302 and the NFT 284 may each comprise additional or fewer TE surfaces and angles.

In the HAMR write head 300E of FIG. 3E, the stable material 302 comprises a first layer 334 and a second layer 336, where both the first and second layers 334, 336 extend to the MFS. The first layer 334 is disposed on TE side and the second layer 336 is disposed on the LE side. The first and second layers 334, 336 each comprises different materials from one another and from the NFT 284. The first and second layers 334, 336 each individually comprises one or more materials selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. In some embodiments, the second layer 336 comprises a material having a lower optical loss than the first layer 334. The first and second layers 334, 336 may extend to the dotted line 324, or may be angled like the dotted line 326 of FIG. 3G. As such, the first and second layers 334, 336 may have different lengths in the z-direction and/or different thicknesses in the y-direction.

The HAMR write head 300F of FIG. 3F is similar to the HAMR write head 300E of FIG. 3E; however, the first layer 334 is disposed at the MFS and the second layer 336 is recessed from the MFS by the first layer 334. The first and second layers 334, 336 comprise different materials, and the NFT 284 comprises a different material than both the first and second layers 334, 336. The first and second layers 334, 336 may have different lengths in the z-direction and/or different thicknesses in the y-direction.

The HAMR write head 300G of FIG. 3G is similar to the HAMR write head 300E of FIG. 3E and the HAMR write head 300F of FIG. 3F; however, the HAMR write head 300G further comprises a third layer 338. The first layer 334 is disposed at the MFS and the second and third layers 336, 338 are recessed from the MFS by the first layer 334. In some embodiments, the second layer 336 may extend to the MFS, like shown in FIG. 3E. The second layer 336 is disposed on the TE side, and the third layer 338 is disposed between and in contact with the second layer 336 and the NFT 284. The first, second, and third layers 334, 336, 338 are each disposed in contact with one another. In one embodiment, the first, second, and third layers 334, 336, 338 all comprise a different material from one another and from the NFT 284. In another embodiment, the first and second layers 334, 336 may comprise the same material. The first, second, and third layers 334, 336, 338 may have different lengths in the z-direction and/or different thicknesses in the y-direction. In some embodiments, the third layer 338 is optional. While not shown, the HAMR write head 300G may comprise a trailing edge taper, as discussed above. In some embodiments, a thin diffusion barrier with a thickness of about 1 nm to about 5 nm can be inserted at the boundary of different materials, such as between the first, second, and/or third layers 334, 336, 338, to prevent material from migrating to other material regions. Examples of the material of the diffusion barrier are described above.

FIG. 3H illustrates a top or TE view of a HAMR write head 300H, and FIG. 3I illustrates a top or TE view of a HAMR write head 300I, according to various embodiment. The stable material 302 and the NFT 284 are surrounded by insulation layers 312, 314, which may comprise the same material as the insulating layers 308 and 310. The NFT 284 and the stable material 302 each comprise a first side 340 and a second side 342, where the first and second sides 340, 342 are disposed between the TE and LE sides. The first and second sides 340 and 342 of the stable material 302 are flared, and the first and second sides 340, 342 are symmetrical. In FIG. 3H, the flare angle of the first and second sides 340, 342 is gradual such that the first and second sides 340, 342 are curved.

In FIG. 3I, first surfaces 341a of the stable material 302 have a flare angle FA1 of about 0 degrees to about 15 degrees, and second surfaces 341b of the stable material 302 have a flare angle FA2 of about 10 degrees to about 60 degrees. First surfaces 341c of the NFT 284 have a flare angle FA3 of about 30 degrees to about 60 degrees, and second surfaces 341d of the NFT 284 have a flare angle FA4 of about 10 degrees to about 60 degrees. For example: FA1 may be about 0 degrees to about 5 degrees, FA2 may be about 20 degrees to about 30 degrees, FA3 may be about 30 degrees to about 40 degrees, and FA4 may be about 40 degrees to about 50 degrees; FA1 may be about 0 degrees to about 5 degrees, FA2 may be about 10 degrees to about 20 degrees, FA3 may be about 50 degrees to about 60 degrees, and FA4 may be about 40 degrees to about 50 degrees; or FA1 may be about 0 degrees to about 5 degrees, FA2 may be about 50 degrees to about 60 degrees, FA3 may be about 40 degrees to about 50 degrees, and FA4 may be about 20 degrees to about 30 degrees. While the stable material 302 and the NFT 284 are each shown with two surfaces and two flare angles, the stable material 302 and the NFT 284 may comprise fewer or additional surfaces and flare angles. In FIG. 3I, the second surface 302b of the stable material 302 is placed at the second flare, but it can be placed at the first flare, other flares, or at the intersection between two flare angles. At the location where the flare angle changes, a fillet can be added between two flare angles such that the flare angle gradually changes at the intersection between two flare angles.

Figure 4:
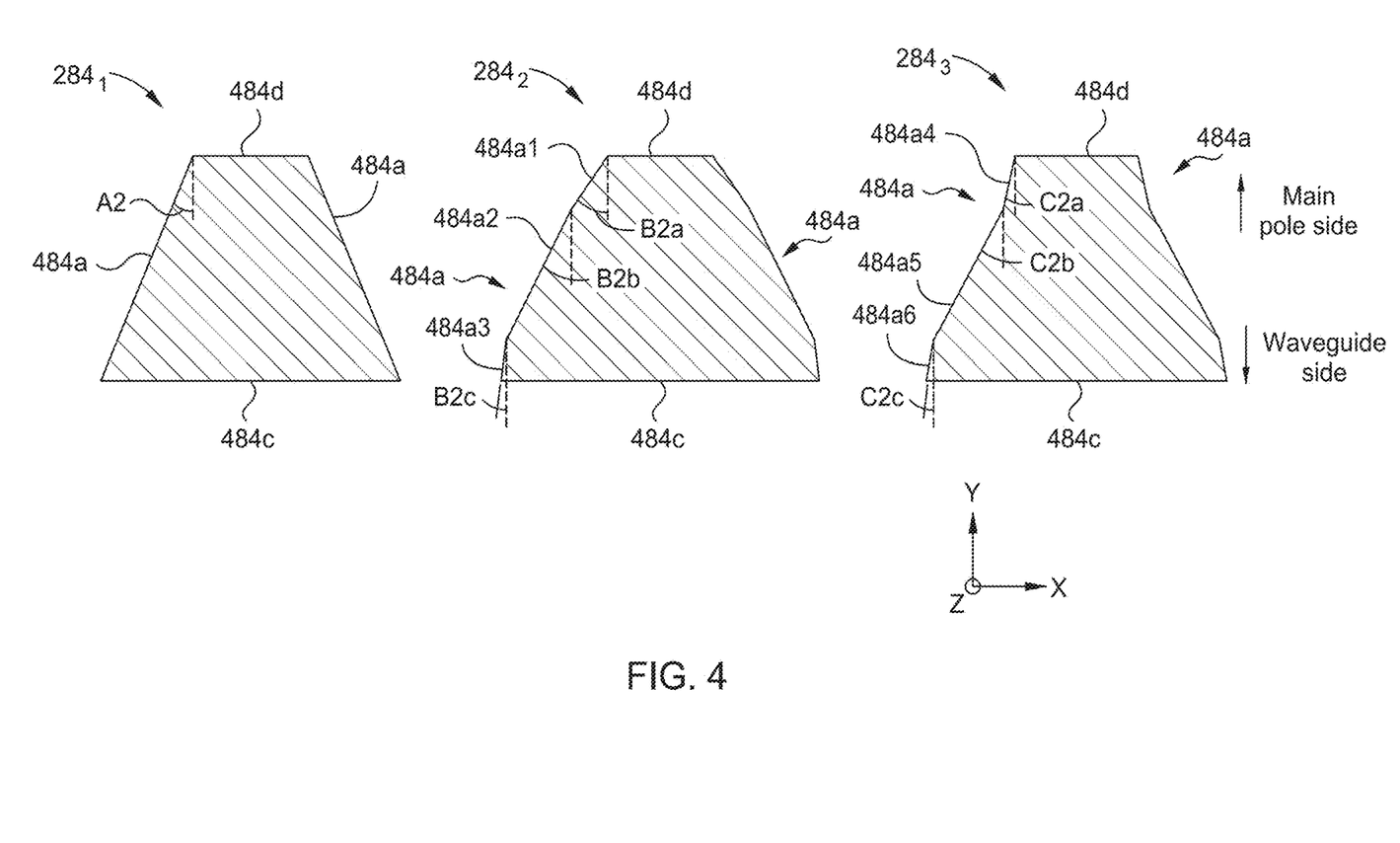
FIG. 4 illustrates various cross-sectional views through the line "FIG. 4" of FIG. 3I of the NFT of the HAMR write heads of FIGS. 3A-3I, according to various embodiments.

FIG. 4 illustrates various cross-sectional views through the line "FIG. 4" of FIG. 3I of the NFT 284 of the HAMR write heads of FIGS. 3A-3I, according to various embodiments. FIG. 4 illustrates three cross-sectional views of the NFT $284_1$, $284_2$, and $284_3$. Each NFT embodiment $284_1$, $284_2$, and $284_3$ may be the NFT 284 of FIGS. 3A-3I.

The first embodiment of the NFT $284_1$ has a substantially rectangular or trapezoidal shape having one flare angle A2 of about 0 degrees to about 45 degrees. The side surfaces 484a are tapered such that the third surface 484c (i.e., the surface facing the waveguide 242) has a greater length in the x-direction than the fourth surface 484d (i.e., the surface facing the main pole 236).

The second embodiment of the NFT $284_2$ flares outwardly, where each side surface is the same. Each side surface 484a comprises a first sub-surface 484a1, a second sub-surface 484a2, and a third sub-surface 484a3. The first sub-surface 484a1 is disposed at an angle B2a of about 20 degrees to about 30 degrees with respect to a plane perpendicular to the MFS in a downtrack direction (i.e., the y-direction). The second sub-surface 484a2 is disposed at an angle B2b of about 15 degrees to about 25 degrees with respect to a plane perpendicular to the MFS in the downtrack direction, and the third sub-surface 484a3 is disposed at an angle B2c of about 5 degrees to about 15 degrees with respect to a plane perpendicular to the MFS in the downtrack direction. While three sub-surfaces are shown, the side surfaces 484a may comprise fewer or additional sub-surfaces.

The third embodiment of the NFT $284_3$ flares inwardly near the fourth surface 484d before flaring outwardly near the third surface 484c. Each side surface 484a is the same. Each side surface 484a comprises a first sub-surface 484a4, a second sub-surface 484a5, and a third sub-surface 484a6. The first sub-surface 484a4 is disposed at an angle C2a of about 0 degrees to about 10 degrees with respect to a plane perpendicular to the MFS in the downtrack direction. The second sub-surface 484a5 is disposed at an angle C2b of about 15 degrees to about 25 degrees with respect to a plane perpendicular to the MFS in the downtrack direction, and the third sub-surface 484a6 is disposed at an angle C2c of about 5 degrees to about 15 degrees with respect to a plane perpendicular to the MFS in the downtrack direction. While three sub-surfaces are shown, the side surfaces 484a may comprise fewer or additional sub-surfaces.

Figure 5:
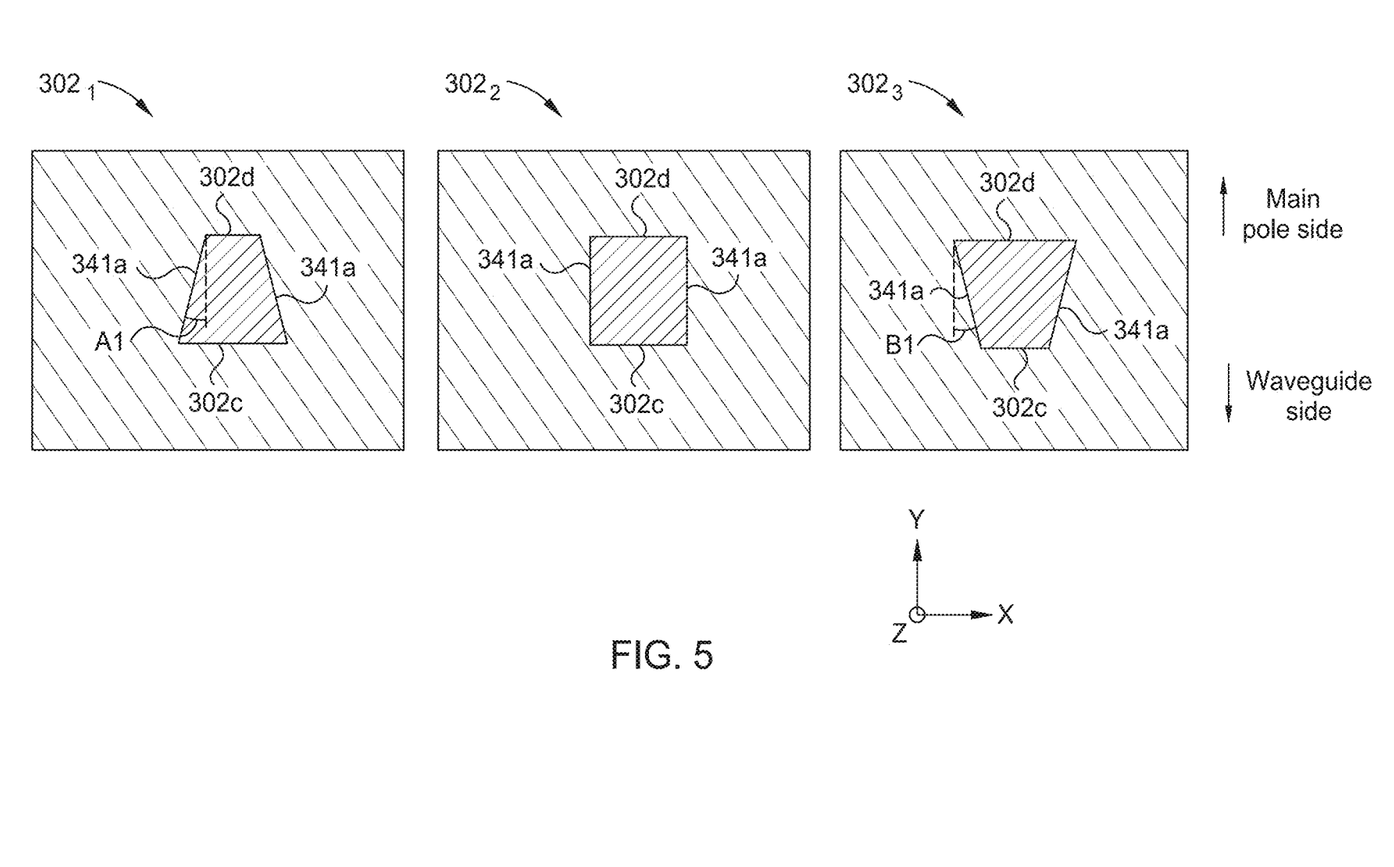
FIG. 5 illustrates various cross-sectional views through the line "FIG. 5" of FIG. 3I of the stable material of the HAMR write heads of FIGS. 3A-3I, according to various embodiments.

FIG. 5 illustrates various cross-sectional views through the line "FIG. 5" of FIG. 3I of the stable material 302 of the HAMR write heads of FIGS. 3A-3I, according to various embodiments. FIG. 5 illustrates three cross-sectional views of the stable material $302_1$, $302_2$, and $302_3$. Each stable material embodiment $302_1$, $302_2$, and $302_3$ may be the stable material 302 of FIGS. 3A-3I.

The first embodiment of the stable material $302_1$ has a cross-sectional trapezoidal shape having a positive angle A1 of about 5 degrees to about 30 degrees such that the fourth surface 302d (i.e., the surface facing the main pole 236) has a smaller width in the x-direction than the third surface 302c (i.e., the surface facing the waveguide 242). The second embodiment of the stable material $302_2$ has a substantially square or rectangular cross-sectional shape where the third and fourth surfaces 302c, 302d are parallel to one another. The third embodiment of the stable material $302_3$ has a cross-sectional trapezoidal shape having a negative angle B1 of about 5 degrees to about 30 degrees such that the fourth surface 302d has a greater width in the x-direction than the third surface 302c.

During write operations, an optical near-field is generated near the top corner of the NFT (e.g., the MFS side of the interface between the NFT and dielectric layer), and the top corner of the NFT is locally heated and sometimes deformed due to heat. By adding the stable material at the top corner of the NFT, deformation of the NFT is prevented, and the lifetime of the NFT is improved. The stable material typically has a higher optical loss than the material used for the main body of NFT and causes an extremely high temperature. The heat is transferred to the main body of NFT, which sometimes causes deformation of the main body of the NFT near the stable material layer. By varying the shape of the stable material layer as described above, heat flow from the main body of the NFT to the thermal shunt is increased and the temperature of the main body of the NFT is thus reduced. Therefore, the lifetime of the NFT is improved. The stable material also reduces the confinement of optical near-field due to higher optical loss and decreases the thermal gradient in the recording layer, which reduces areal recording density. By varying the shape of the stable material layer as described above, the amount of stable material with higher optical loss can be reduced, and the confinement of the optical near-field is improved. Therefore, the thermal gradient in the recording layer can be increased and thus, the areal recording density can be increased.

In one embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein: the stable material and the NFT comprise different materials, and the stable material comprises a first surface disposed at the MFS, a second surface opposite the first surface, a third surface facing the waveguide, and a fourth surface facing the main pole.

The third surface is tapered at an angle of about 5 degrees to about 50 degrees with respect to a plane perpendicular to the MFS. The fourth surface is tapered at an angle of about 5 degrees to about 50 degrees with respect to a plane perpendicular to the MFS. The stable material comprises two or more different materials. The stable material comprises a material selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN. The third surface comprises one or more sub-surfaces, the one or more sub-surfaces each being disposed at an angle of about 5 degrees to about 40 degrees. The second surface has a greater length than the first surface. A magnetic recording device comprises the magnetic recording head.

In another embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein the stable material comprises: a first surface disposed at the MFS, a second surface opposite the first surface, the second surface being disposed in contact with the NFT, a third surface facing the waveguide, a fourth surface facing the main pole, a fifth surface connecting the third surface to the fourth surface, and a sixth surface opposite the fifth surface, wherein the stable material and the NFT comprise different materials.

The second surface is disposed at an angle. The second surface is rounded. The fifth and sixth surfaces are disposed at an angle between the third and fourth surface. The fifth and sixth surfaces are disposed at an angle between the MFS and the NFT. A magnetic recording device comprises the magnetic recording head.

In yet another embodiment, a magnetic recording head comprises a main pole, a waveguide disposed adjacent to the main pole, a near field transducer (NFT) coupled between the main pole and the waveguide, a thermal shunt disposed on the NFT, the thermal shunt being recessed from a media facing surface (MFS), and a stable material disposed between the NFT and the MFS, the stable material being spaced from the thermal shunt, wherein the stable material comprises: a first surface disposed at the MFS, a second surface opposite the first surface, the second surface being disposed in contact with the NFT, a third surface facing the waveguide, and a fourth surface facing the main pole, wherein the stable material comprises a first layer and a second layer, the first layer, the second layer, and the NFT each comprising different materials.

The third surface is tapered at an angle of about 5 degrees to about 50 degrees with respect to a plane perpendicular to the MFS. The first layer is disposed at the MFS and the second layer is disposed between the first layer and the NFT. The first layer forms the fourth surface and a portion of the first and second surfaces, and wherein the second layer forms the third surface and a portion of the first and second surfaces. The stable material further comprises a third layer, wherein the first layer is disposed at the MFS and the second and third layers are recessed from the MFS. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole;
a waveguide disposed adjacent to the main pole;
a near field transducer (NFT) coupled between the main pole and the waveguide;
a thermal shunt disposed on the NFT, the thermal shunt being recessed from a media facing surface (MFS); and
a stable material disposed between the NFT and the MFS, the stable material being spaced from the thermal shunt, wherein:
the stable material and the NFT comprise different materials, and
the stable material comprises a first surface disposed at the MFS, a second surface opposite the first surface, a third surface facing the waveguide, and a fourth surface facing the main pole.

2. The magnetic recording head of claim 1, wherein the third surface is tapered at an angle of about 5 degrees to about 50 degrees with respect to a plane perpendicular to the MFS.

3. The magnetic recording head of claim 1, wherein the fourth surface is tapered at an angle of about 5 degrees to about 50 degrees with respect to a plane perpendicular to the MFS.

4. The magnetic recording head of claim 1, wherein the stable material comprises two or more different materials.

5. The magnetic recording head of claim 1, wherein the stable material comprises a material selected from the group consisting of: Au, Ag, Cu, Al, Rh, Ir, Ru, Cr, Pt, Ti, Fe, Co, Ni, Pd, Cd, Zn, Be, Mo, W, ZrN, TiN, HfN, and NbN.

6. The magnetic recording head of claim 1, wherein the third surface comprises one or more sub-surfaces, the one or more sub-surfaces each being disposed at an angle of about 5 degrees to about 40 degrees.

7. The magnetic recording head of claim 1, wherein the second surface has a greater length than the first surface.

8. A magnetic recording device comprising the magnetic recording head of claim 1.

9. A magnetic recording head, comprising:
a main pole;
a waveguide disposed adjacent to the main pole;
a near field transducer (NFT) coupled between the main pole and the waveguide;
a thermal shunt disposed on the NFT, the thermal shunt being recessed from a media facing surface (MFS); and
a stable material disposed between the NFT and the MFS, the stable material being spaced from the thermal shunt, wherein the stable material comprises:
a first surface disposed at the MFS;
a second surface opposite the first surface, the second surface being disposed in contact with the NFT;
a third surface facing the waveguide;
a fourth surface facing the main pole;
a fifth surface connecting the third surface to the fourth surface; and
a sixth surface opposite the fifth surface, wherein the stable material and the NFT comprise different materials.

10. The magnetic recording head of claim 9, wherein the second surface is disposed at an angle.

11. The magnetic recording head of claim 9, wherein the second surface is rounded.

12. The magnetic recording head of claim 9, wherein the fifth and sixth surfaces are disposed at an angle between the third and fourth surface.

13. The magnetic recording head of claim 9, wherein the fifth and sixth surfaces are disposed at an angle between the MFS and the NFT.

14. A magnetic recording device comprising the magnetic recording head of claim 9.

15. A magnetic recording head, comprising:
a main pole;
a waveguide disposed adjacent to the main pole;
a near field transducer (NFT) coupled between the main pole and the waveguide;
a thermal shunt disposed on the NFT, the thermal shunt being recessed from a media facing surface (MFS); and
a stable material disposed between the NFT and the MFS, the stable material being spaced from the thermal shunt, wherein the stable material comprises:
a first surface disposed at the MFS;
a second surface opposite the first surface, the second surface being disposed in contact with the NFT;
a third surface facing the waveguide; and
a fourth surface facing the main pole, wherein the stable material comprises a first layer and a second layer, the first layer, the second layer, and the NFT each comprising different materials.

16. The magnetic recording head of claim 15, wherein the third surface is tapered at an angle of about 5 degrees to about 50 degrees with respect to a plane perpendicular to the MFS.

17. The magnetic recording head of claim 15, wherein the first layer is disposed at the MFS and the second layer is disposed between the first layer and the NFT.

18. The magnetic recording head of claim 15, wherein the first layer forms the fourth surface and a portion of the first and second surfaces, and wherein the second layer forms the third surface and a portion of the first and second surfaces.

19. The magnetic recording head of claim 15, wherein the stable material further comprises a third layer, wherein the first layer is disposed at the MFS and the second and third layers are recessed from the MFS.

20. A magnetic recording device comprising the magnetic recording head of claim 15.

* * * * *